United States Patent
Yoon

(10) Patent No.: US 12,140,372 B2
(45) Date of Patent: Nov. 12, 2024

(54) REFRIGERATOR AND METHOD FOR CONTROLLING REFRIGERATOR

(71) Applicant: LG Electronics Inc., Seoul (KR)

(72) Inventor: Hyunseok Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 775 days.

(21) Appl. No.: 17/253,986

(22) PCT Filed: Jul. 10, 2019

(86) PCT No.: PCT/KR2019/008490
§ 371 (c)(1),
(2) Date: Dec. 18, 2020

(87) PCT Pub. No.: WO2020/013599
PCT Pub. Date: Jan. 16, 2020

(65) Prior Publication Data
US 2021/0270519 A1    Sep. 2, 2021

(30) Foreign Application Priority Data
Jul. 13, 2018    (KR) .......................... 10-2018-0081872

(51) Int. Cl.
*F25D 29/00*    (2006.01)
*F25D 23/02*    (2006.01)

(52) U.S. Cl.
CPC ........... *F25D 29/00* (2013.01); *F25D 23/028* (2013.01); *F25D 2400/36* (2013.01); *F25D 2600/02* (2013.01); *F25D 2700/04* (2013.01)

(58) Field of Classification Search
CPC .... F25D 23/02; F25D 23/028; F25D 2400/36; F25D 2600/02; F25D 2700/04; F25D 29/00
See application file for complete search history.

(56) References Cited

U.S. PATENT DOCUMENTS 6,975,926 B2 *  12/2005  Schanin ................. H02J 9/005
                                                      62/157
8,668,289 B2 *  3/2014   Lee ...................... F25D 25/025
                                                      312/405
(Continued)

FOREIGN PATENT DOCUMENTS

CN           105953519         9/2016
EP            3190366          7/2017
(Continued)

OTHER PUBLICATIONS

Machine Translation of JP 2017-146058 to Yabukami; Aug. 2017; Search; description; all pages (Year: 2017).*
(Continued)

*Primary Examiner* — Filip Zec
(74) *Attorney, Agent, or Firm* — Fish & Richardson P.C.

(57) ABSTRACT

A refrigerator includes a main body that defines a storage chamber; a door coupled to the main body and configured to open and close the storage chamber, first sensor disposed at the main body and configured to sense a user in a vicinity of the refrigerator, and a second sensor configured to sense a user input for selecting at least one function related to the door, and a control unit configured to, based on the basis of a sensing result from the first sensor, switch the second sensor to an active state to sense the user input, and execute the at least one function related to the door based on a sensing result from the second sensor.

14 Claims, 12 Drawing Sheets

(56) References Cited

U.S. PATENT DOCUMENTS

| | | | |
|---|---|---|---|
| 9,689,603 B2 * | 6/2017 | Roh | F25D 23/028 |
| 10,664,132 B2 * | 5/2020 | Broen | G06F 3/03547 |
| 11,650,628 B1 * | 5/2023 | Nicholson | G06F 3/044 |
| | | | 361/679.01 |
| 2014/0252091 A1 * | 9/2014 | Morse | G06F 16/70 |
| | | | 312/404 |
| 2017/0191744 A1 * | 7/2017 | Koo | F25D 29/005 |
| 2020/0219606 A1 * | 7/2020 | Koh | G06Q 30/0631 |

FOREIGN PATENT DOCUMENTS

| | | | | |
|---|---|---|---|---|
| FR | 2908406 A1 * | 5/2008 | ....... | B32B 17/10036 |
| JP | 2017146058 | 8/2017 | | |
| KR | 1020080004822 | 1/2008 | | |
| KR | 1020080079920 | 9/2008 | | |
| KR | 1020120085122 | 7/2012 | | |
| KR | 1020140128098 | 11/2014 | | |
| KR | 1020170082092 | 7/2017 | | |
| KR | 1020180080107 | 7/2018 | | |
| WO | WO2016200050 | 12/2016 | | |
| WO | WO-2017041261 A1 * | 3/2017 | | |

OTHER PUBLICATIONS

Machine Translation of EP 3190366 to Koo, Dec. 2017; Search, description; all pages (Year: 2017).*
Korean Notice of Allowance in Korean Application No. 10-2018-0081872, dated Jun. 2, 2020, 6 pages (with English translation).
Extended European Search Report in European Appln No. 19834314.7, dated Mar. 14, 2022, 9 pages.

* cited by examiner

REFRIGERATOR AND METHOD FOR CONTROLLING REFRIGERATOR

CROSS-REFERENCE TO RELATED APPLICATIONS

This application is a National Stage filing under 35 U.S.C. 371 of International Application No. PCT/KR2019/008490, filed on Jul. 10, 2019, which claims the benefit of earlier filing date and right of priority to Korean Patent Application No. 10-2018-0081872, filed on Jul. 13, 2018, the contents of which are all hereby incorporated by reference herein in their entirety.

TECHNICAL FIELD

The present disclosure relates to a refrigerator and a method for controlling the same.

BACKGROUND

A refrigerator is a device that can freeze or refrigerate food or the like by lowering a temperature in the refrigerator by discharging cold air generated by a refrigeration cycle defined by operation of a compressor, a condenser, an expansion valve, an evaporator, and the like.

The refrigerator may include a door that is opaque and configured to open and close a storage chamber of a main body of the refrigerator. The door may be configured to be opened and closed so that a user can access a refrigerating chamber or a freezing chamber. The user may not recognize a type and a location of food stored in the refrigerator before opening the door.

When the door of the refrigerator is opaque, the user may not check the food stored in the refrigerator without opening the door of the refrigerator. In some cases, a refrigerator may provide a knock-on function in which at least a part of a door is switched from an opaque state to a transparent state in which light can be transmitted according to a predetermined input such as a knock or a touch. With the knock-on function, a user can check a state of the stored food without opening the door by switching the door to the transparent state as needed.

In some cases, a malfunction may occur when a state of the door is changed simply by sensing a predetermined input. For example, in some cases, where the state of the door is changed by sensing a vibration or a touch, the state of the door may also be changed by a low-frequency sound that causes a vibration or a simple shock applied to the door. In some cases, where the state of the door is changed by sensing an audio signal of knock on the door, the state of the door may be changed by a noise caused by a physical shock that is not in accordance with a user's intention.

A frequent malfunction of the knock-on function may result in distrust and dissatisfaction on the product and function. In addition, since a lighting in the refrigerator is turned on when the state of the door is switched, unnecessary power may be consumed due to the state change of the door and the light emission.

SUMMARY

The present disclosure describes a refrigerator and a method for controlling the same having a low probability of malfunction of the knock-on function.

The present disclosure also describes a refrigerator and a method for controlling the same with less unnecessary power consumption by reducing the possibility of malfunction of the knock-on function.

According to one aspect of the subject matter described in this application, a refrigerator includes a main body that defines a storage chamber, door coupled to the main body and configured to open and close at least a portion of the storage chamber, and a sensing unit including a first sensor located at the main body and configured to detect a user in a sensing range of the first sensor, and a second sensor configured to be maintained in an inactive state and to be switched into an active state to sense a user input for selecting at least one function related to the door. The refrigerator further includes a controller configured to control the sensing unit, switch the second sensor from the inactive state to the active state based on a sensing result of the first sensor, and execute the at least one function related to the door based on a sensing result of the second sensor.

Implementations according to this aspect may include one or more of the following features. For example, the controller can maintain the second sensor in the inactive state by cutting off power supplied to the second sensor, and switch the second sensor into the active state by supplying power to the second sensor based on the sensing result of the first sensor. In some examples, the controller can maintain the first sensor in an active state to detect the user in the sensing range. In some examples, the first sensor is located at or above a predetermined height.

In some implementations, the second sensor is configured to sense a knock-on input of the user, and includes at least one of a touch sensor disposed at the door or a microphone disposed adjacent to the door. In some implementations, the second sensor is configured to sense the user input for an auto door function, and include a proximity sensor that is located at a lower portion of the refrigerator and configured to sense a user's body approaching the lower portion of the refrigerator. In some examples, the controller is configured to display a state of the proximity sensor by a predetermined indicator based on the proximity sensor being activated.

In some implementations, the controller is configured to determine whether the user input is sensed by the second sensor, and based on determining that the user input is not sensed by the second sensor for a predetermined time, switch the second sensor from the active state to the inactive state.

In some implementations, the second sensor includes (i) a first function sensor configured to detect a first user input for selecting a first function among a plurality of functions related to the door, and (ii) a second function sensor configured to sense a second user input for selecting a second function among the plurality of functions related to the door. The controller can be configured to switch the first function sensor into the active state based on the sensing result of the first sensor, execute the first function based on sensing the first user input by the first function sensor, while executing the first function, switch the second function sensor into the active state, and sense the second user input by the second function sensor that is switched to the active state.

In some examples, the door is configured to, by the controller, be switched from (i) an opaque state in which an interior of the storage chamber is not visible from an outside of the door to (ii) a transparent state in which the interior of the storage chamber is visible from the outside. The first function can include a knock-on function for switching the door from the opaque state to the transparent state, and the second function can include an auto door function for opening the door.

In some implementations, the controller is configured to constantly maintain the first sensor in the active state regardless of whether the second sensor is in the active state or the inactive state. In some implementations, the second sensor is configured to sense at least one of a contact between the door and the user, a sound generated by the contact, or a part of the user inserted between the door and a floor on which the refrigerator is installed.

In some implementations, the door includes a plurality of doors, and the controller is configured to, based on a first sensing result of the second sensor, switch at least one of the plurality of doors from (i) an opaque state in which an interior of the storage chamber is not visible from an outside of the door to (ii) a transparent state in which the interior of the storage chamber is visible from the outside. In some examples, the controller is configured to, based on a second sensing result of the second sensor, open one of the plurality of doors while the at least one of the plurality of doors is in the transparent state.

In some implementations, the controller is configured to, based on lack of the first sensing result and the second sensing result for a predetermined time, switch the second sensor from the active state to the inactive state.

According to another aspect, a method controls a refrigerator including a first sensor configured to sense a user in a sensing range of the first sensor, and a second sensor configured to be maintained in an inactive state and to be switched to an active state to sense a user input, and a controller configured to control operation of the first and second sensors. The method includes sensing the user in the sensing range by the first sensor, switching the second sensor from the inactive state to the active state based on a sensing result of the first sensor, sensing the user input by the second sensor that is in the active state, and executing at least one function related to a door of the refrigerator based on a sensing result of the second sensor.

Implementations according to this aspect may include one or more of the following features and the operations of the controller described above. For instance, sensing the user input can include determining whether the user input is sensed for a predetermined time by the second sensor, based on determining that the user input is not sensed for the predetermined time, checking the sensing result of the first sensor, and switching the second sensor from the active state to the inactive state based on checking the sensing result of the first sensor.

According to another aspect, a method controls a refrigerator including a human body sensor, a knock-on sensor, and an auto door sensor. The method includes sensing a user in a sensing range of the human body sensor, switching the knock-on sensor from an inactive state to an active state based on sensing the user by the human body sensor, sensing a user input applied to a door of the refrigerator by the knock-on sensor that is switched to the active state, based on the knock-on sensor sensing the user input applied to the door, executing a knock-on function on the door and switching the auto door sensor from an inactive state to an active state, displaying the active state of the auto door sensor and sensing a user's body within a predetermined distance from the refrigerator by the auto door sensor, and opening the door by executing an auto door function based on a sensing result of the auto door sensor.

Implementations according this aspect may include one or more of the following features and the operations of the controller described above. For example, the method can include maintaining the human body sensor in an active state, where the human body sensor is located above the auto door sensor, and is located at or above a predetermined height from a floor on which the refrigerator is installed. In some examples, maintaining the human body sensor in the active state includes constantly maintaining the human body sensor in the active state regardless of whether the knock-on sensor and the auto door sensor are in the active state or the inactive state.

In some implementations, the refrigerator and method described in the present disclosure has an effect of reducing a possibility of a malfunction of a knock-on function by activating a sensor for the knock-on function when a human body is sensed by a human body sensor disposed at a predetermined height from a floor on which a refrigerator is installed.

In some implementations, the refrigerator and method described in the present disclosure can help to prevent or reduce unnecessary power consumption due to a malfunction of the knock-on function by reducing the possibility of the malfunction of the knock-on function.

In some implementations, the refrigerator and method described in the present disclosure can help to prevent a function of the refrigerator that is not intended by a user from being executed, by activating a sensor related to other functions of the refrigerator when a human body is sensed by a human body sensor disposed at a predetermined height from a floor on which the refrigerator is installed.

DETAILED DESCRIPTION

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Figure 1A:
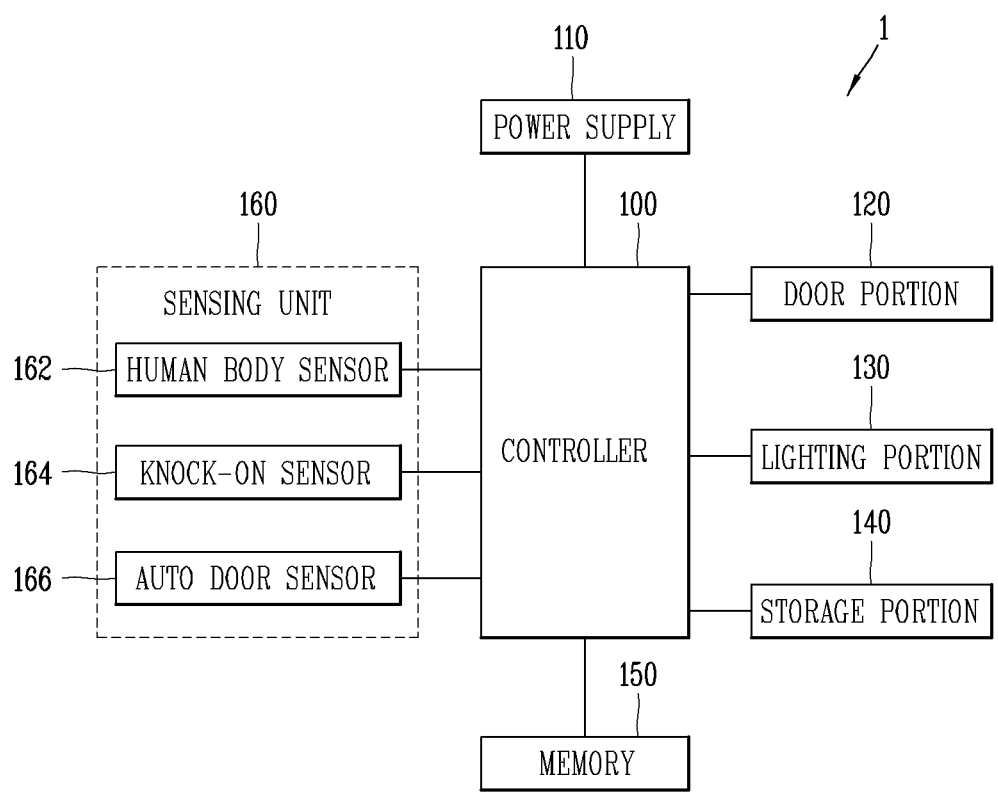
FIG. 1A is a block diagram illustrating a structure of an example refrigerator.

FIG. 1A is a block diagram of an example of a refrigerator 1.

The refrigerator 1 may include a controller 100, and a power supply 110, a door portion 120, a lighting portion 130, a storage portion 140, a memory 150, and a sensing unit 160 connected with the controller and controlled by the controller 100. FIG. 1 shows the refrigerator 1 having various components, but it may be understood that implementing all of the shown components is not a requirement. Greater or fewer components may alternatively be implemented.

In some implementations, the power supply 110 may receive power from outside to supply the power to each component included in the refrigerator 1 by a control of the controller 100.

In some examples, the door portion 120 may include a plurality of doors provided on at least one surface of a main body of the refrigerator 1 in order to selectively open and close a storage chamber provided in the refrigerator 1.

Here, the plurality of doors may be provided with at least one sensor to sense a user's input. For example, the plurality of doors may form a mutual layer structure with a touch sensor to sense a user's touch input applied to the door. Alternatively, the plurality of doors may include an audio sensor to sense a knock input of a user knocking on the door.

In addition, the plurality of doors may be configured such that transparency of at least a part of the doors can be adjusted from a completely opaque state to a transparent state, and the transparency can be adjusted in relation to a sensed user's input. Therefore, the plurality of doors may be configured such that, when a user's input is sensed, a transparency of the door at which the user's input is sensed is adjusted (hereinafter, a knock-on function), or a door at which the user's input is sensed is automatically opened (hereinafter, an auto door function).

In addition, the lighting portion 130 may include at least one lighting provided in a storage chamber of the refrigerator 1. When the storage chamber is divided into a plurality of storage areas, at least one lighting may be provided in each of the plurality of storage areas, and may be turned on when the door corresponding to the divided storage area is opened. In some examples, as described above, when the door of the refrigerator 1 is configured such that a transparency thereof can be adjusted, the lighting may be turned on according to a state of the door whose transparency is adjusted.

In some examples, the storage portion 140 may include a storage chamber in which food or the like is stored, and the storage chamber may include a predetermined refrigeration cycle consisting of a compressor, a condenser, an expansion valve, and an evaporator configured to discharge cold air generated by the predetermined refrigeration cycle. The storage portion 140 may freeze or refrigerate food or the like stored in the storage chamber by lowering a temperature in the refrigerator 1 with the discharged cold air.

In some examples, the sensing unit 160 may include at least one sensor to sense information in the refrigerator 1 and a surrounding environment around the refrigerator 1.

In more detail, the sensing unit 160 of the refrigerator 1 may include at least one human body sensor 162 capable of sensing a user in a vicinity of the refrigerator. In addition, the refrigerator 1 may further include at least one sensor related to various functions of the refrigerator 1. In some examples, the human body sensor 162 may include a proximity sensor having a predetermined sensing range.

For example, the sensing unit 160 is a sensor related to various functions of the refrigerator 1 and may include a sensor related to the knock-on function. For example, the sensing unit 160 may include at least one of a touch sensor and a microphone. Here, the touch sensor may be configured to sense a user's touch applied to each door by forming a mutual layer with each door. In some examples, the microphone may be configured to sense an audio signal generated when the door is knocked in a predetermined pattern. In this case, the controller 100 may determine whether the knocking is a user's input applied to the door by a pattern of the sensed audio signal. In addition, when a user's input is sensed by the touch sensor or by the microphone, the controller 100 may control the door portion 120 to perform the knock-on function in response thereto. Hereinafter, the sensor related to the knock-on function will be referred to as a knock-on sensor 164.

In addition, the sensing unit 160 is a sensor related to various functions of the refrigerator 1 and may include a sensor related to the auto door function. For example, the sensing unit 160 may further include a proximity sensor capable of sensing a user in a vicinity of the refrigerator 1. Here, the proximity sensor may be configured to sense a body of the user in proximity. For example, the proximity sensor may be configured to sense a body of the user in a sensing range of the proximity sensor. In addition, the controller 100 may control at least one of the plurality of doors of the refrigerator 1 to be opened according to a sensing result of the proximity sensor (auto door function). Hereinafter, the sensor related to the auto door function, such as the proximity sensor, will be referred to as an auto door sensor 166.

The memory 150 is typically implemented to store data to support various functions or features of the refrigerator 1. For instance, the memory 150 may include a non-transitory memory configured to store application programs to be executed in the refrigerator 1, data or instructions for operations of the refrigerator 1, and the like. At least one of the application programs may be downloaded from an external server via wireless communication. Other application programs may be installed within the refrigerator 1 at time of manufacturing or shipping, which is typically the case for basic functions of the refrigerator 1 (for example, a temperature managing function by a storage area).

In some examples, the controller 100 can control an overall operation of the refrigerator 1. The controller 100 may provide or process information or functions appropriate for a user by processing signals, data, information and the like, which are inputted or outputted by the aforementioned various components, or by activating application programs stored in the memory 150.

In some implementations, the controller 100 may control at least some of the components shown in FIG. 1A, to execute application programs stored in the memory 170. In addition, the controller 100 may control at least two of those components included in the refrigerator 1 to activate the application programs.

In addition, the controller 100 may control each connected component. In particular, the controller 100 may control an active state of at least one of other sensors for selecting at least one function related to the door of the refrigerator 1 based on a sensing result of the human body sensor 162.

Here, the at least one function related to the door of the refrigerator 1 may be the knock-on function in which a state of the door is switched from an opaque state in which light cannot be transmitted to a transparent state in which light can be transmitted according to a predetermined input such as a knock or a touch applied to the door. Further, at least one function related to the door of the refrigerator 1 may be the auto door function of automatically opening the door of the refrigerator 1 according to a user's body in a vicinity of the refrigerator 1. Here, the controller 100 may control an active state of the knock-on sensor 164 and an active state of the auto door sensor 166, respectively, based on a sensing result of the human body sensor 162.

In the following description, the function related to the door of the refrigerator 1 will be described by taking the knock-on function or the auto door function as an example. However, the present disclosure is not limited thereto.

First, the controller 100 may control the sensing unit 160 so that the human body sensor 162 maintains the active state at all times. In some examples, the controller 100 may control the sensing unit 160 so that the knock-on sensor 164 and the auto door sensor 166 are switched from an inactive state to an active state or from an active state to an inactive state according to a predetermined condition.

Here, "sensor in active state" may refer to a state in which a sensor is able to sense a predetermined stimulus when a predetermined condition is applied. That is, the "sensor in active state" may refer to a state in which a sensor (a touch sensor or a microphone) is able to sense a touch or an audio signal, or a state in which a sensor (a proximity sensor) is able to sense a body of a nearby user, as power is supplied to the sensor. In some examples, "sensor in inactive state" may refer to a state in which a sensor does not sense a predetermined stimulus even when the predetermined stimulus is applied, as operation power is not supplied to the sensor.

To this end, the controller 100 can control power to be always supplied to the human body sensor 162, so that the human body sensor 162 is able to maintain the active state at all times. In some examples, the controller 100 can control power to be supplied to the knock-on sensor 164 or the auto door sensor 166 according to a predetermined condition, so that the knock-on sensor 164 or the auto door sensor 166 is switched from an inactive state to an active state when the predetermined condition is satisfied.

Figure 1B:
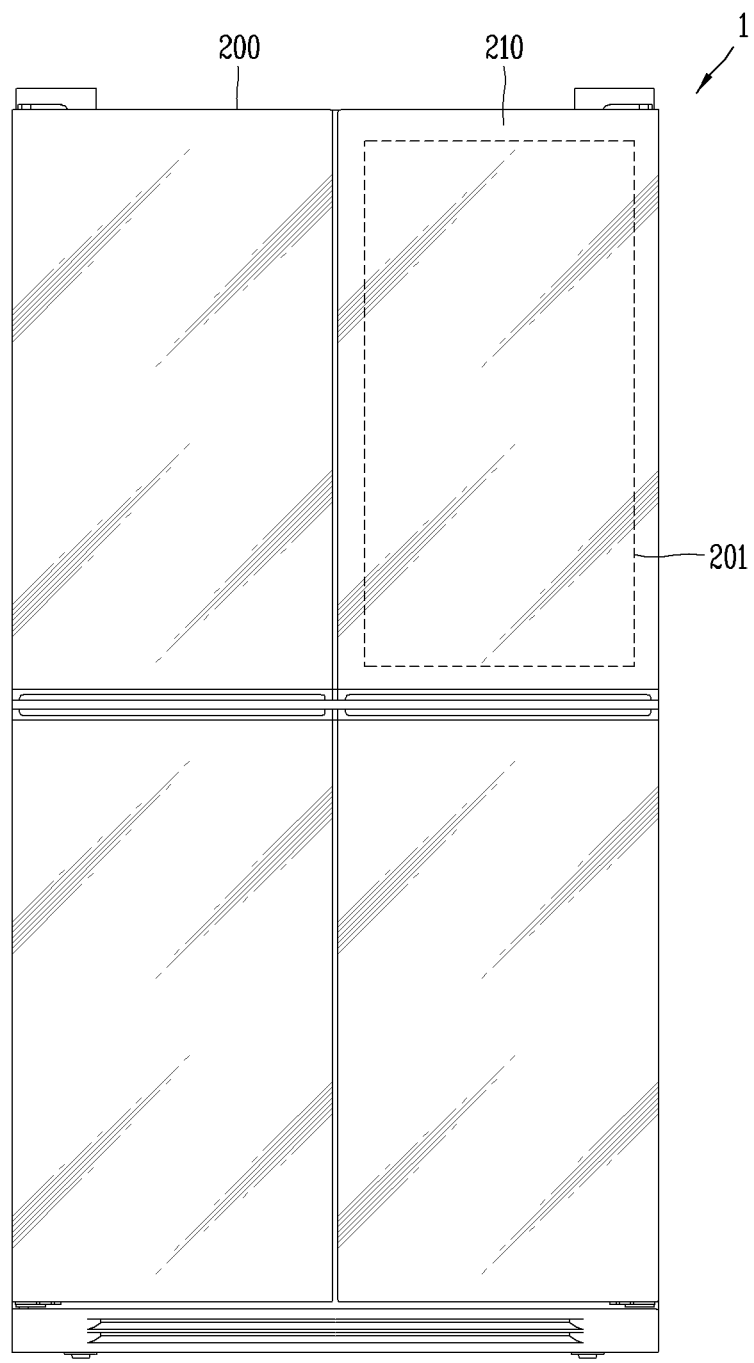
FIGS. 1B to 1D are exemplary views illustrating an example of a refrigerator.
Figure 1C:
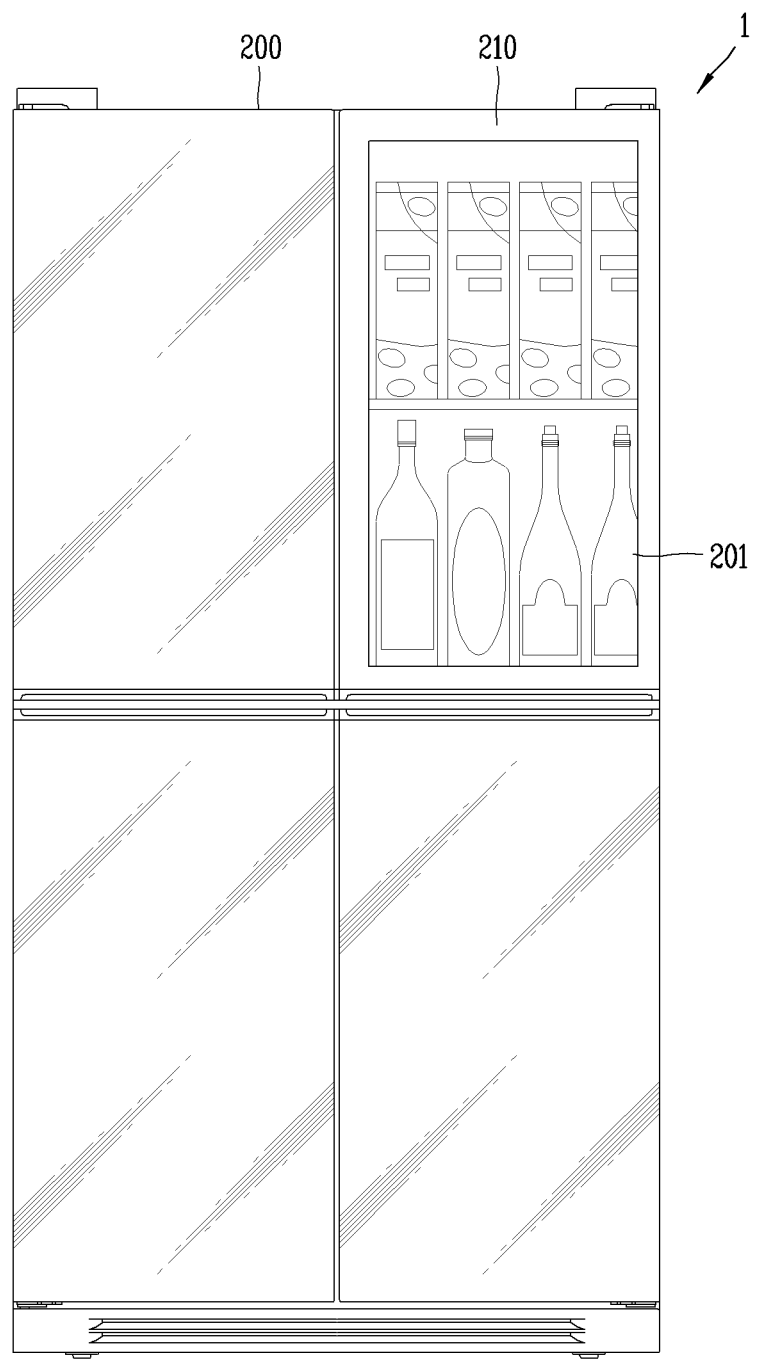

FIGS. 1B and 1C are exemplary views explaining the refrigerator 1.

The refrigerator 1 may include a main body 200 including a storage chamber therein, and at least one door provided on at least one surface of the main body 200 to selectively open and close the storage chamber.

Here, any one of doors 210 may be a door capable of adjusting transparency from a completely opaque state to a transparent state by adjusting the transparency.

In addition, the door 210 may include a microphone to sense a knock on the door 210 in a predetermined pattern. Alternatively, the door 210 may form a mutual layer structure with the touch sensor. Here, at least a part of the door 210 may be provided with a transparent display region 201 capable of displaying various image information such as text, image, or video.

In some examples, when a predetermined touch input is applied to the door 210, the controller 100 may sense such a touch input as an input for switching a state of the door 210 into a transparent state or an opaque state. Here, the predetermined touch input may be a touch input applied to the door 210 or a plurality of knocking applied in a predetermined pattern.

Accordingly, the controller 100 may change the state of the door 210 when a predetermined user input is applied to the door 210. That is, as illustrated in FIG. 1B, when the door 210 is in an opaque state in which food stored in a corresponding storage space is unidentifiable, the controller 100 may control the door 210 such that at least a part of the door 210 is switched to a transparent state in which the stored food is identifiable, as illustrated in FIG. 1C. In some examples, when the door 210 is in a transparent state, the controller 100 may control the door 210 so that the door 210 is switched to an opaque state based on the predetermined user input.

Figure 1D:
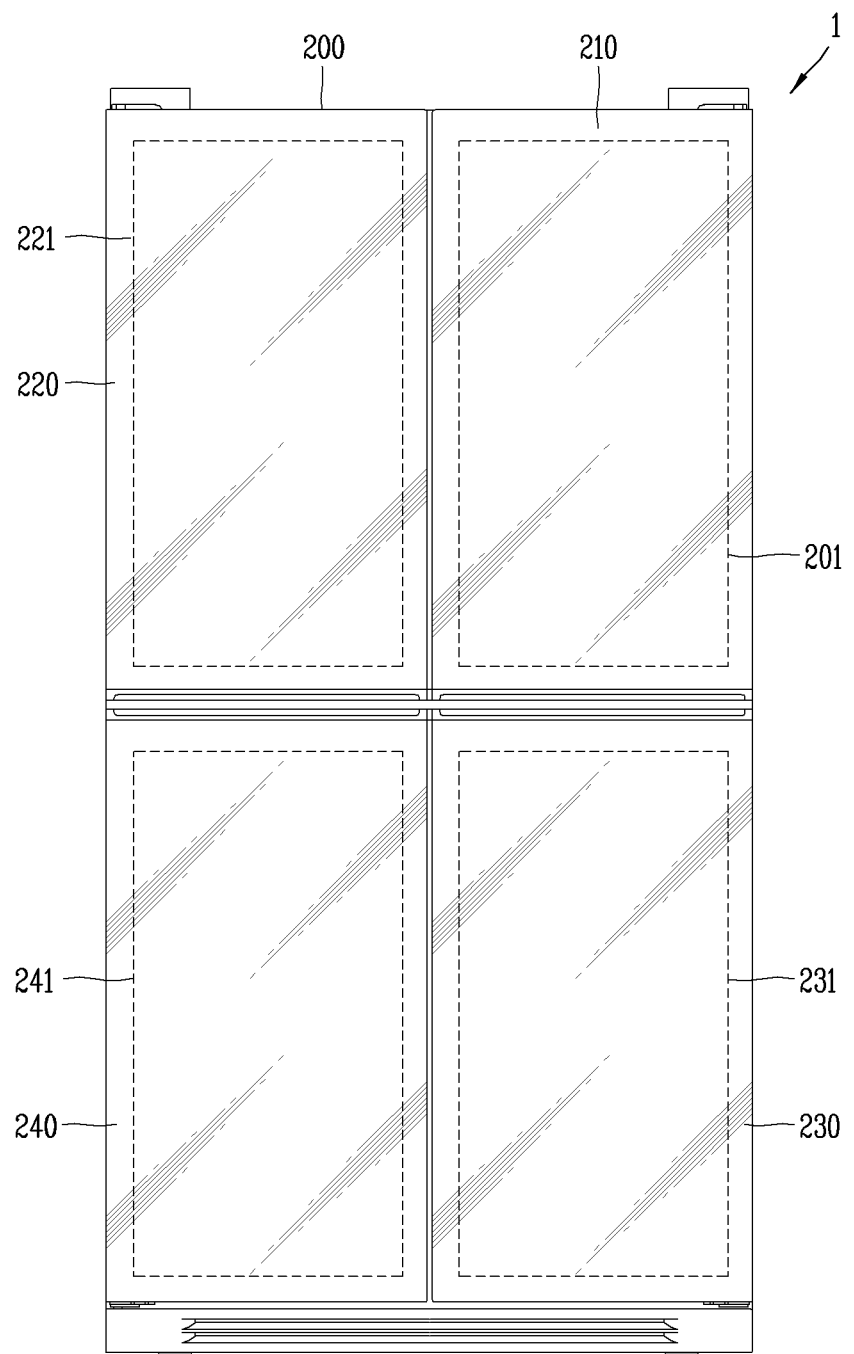

In some examples, in FIGS. 1B and 1C, it has been described as an example that at least a part of any one of the doors provided on the refrigerator 1 is switched to a transparent state. However, unlike this, at least a part of each of the doors provided on the refrigerator 1 can to be switched to a transparent state. FIG. 1D illustrates an example of a refrigerator 1.

As illustrated in FIG. 1D, when the refrigerator 1 includes a plurality of doors 210, 220, 230, and 240 provided on at least one surface of a main body 200, at least a part of each of the doors 210, 220, 230, and 240 may be switched to a transparent state. Here, each of the doors 210, 220, 230, and 240 may include separately controlled transparent display regions 201, 221, 231, and 241, respectively.

In some examples, a controller 100 may control each of the doors 210, 220, 230, and 240 independently of each other. That is, like the door 210 illustrated in FIG. 1B, the controller 100 may control each of the doors 220, 230, and 240 to be switched to a transparent state or an opaque state. And, the controller 100 may control each of storage spaces corresponding to each of the doors 210, 220, 230, and 240 independently of each other to allow various functions related to food in the storage space corresponding to each of the doors 210, 220, 230, and 240 to be performed. The controller 100 may include an electric circuit, an integrated circuit, a processor, a computer, or the like.

In some examples, at least one of the doors of the refrigerator 1 includes a polymer dispersed liquid crystal (PDLC) layer laminated between a first tempered glass layer and a second tempered glass layer, so as to be switched between a transparent state and an opaque state depending on a voltage applied thereto.

FIGS. 2A to 2D are sectional views illustrating an example of a door of a refrigerator and the PDLC layer.

Figure 2A:
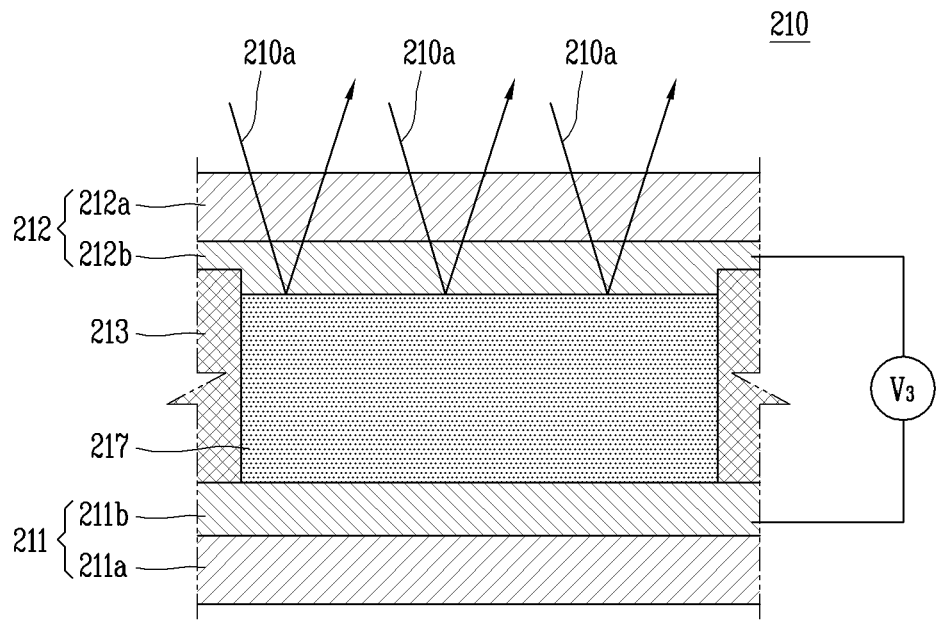
FIGS. 2A to 2D are sectional views illustrating an example of a door of a refrigerator.

Referring to FIG. 2A, when a specific voltage V3 is applied to a first electrode 211*b* and a second electrode 212*b*, all three lights 210*a*, 210*b*, and 210*c* may be reflected. Accordingly, when a second electrode substrate 212*a* is implemented flat, the door 210 may be viewed like a mirror. In particular, when an electric field dependent layer 217 is made of a photonic crystal, the door 210 may have a higher reflectivity.

In some examples, the electric field dependent layer 217 may be formed in such a manner that an electric field dependent material is charged in each cell.

The electric field dependent material charged in the electric field dependent layer 217 is a material whose properties are changed by an electric field formed between the first electrode 211*b* and the second electrode 212*b*, and may be at least one selected from a group including a liquid crystal material, a fluorescent material, a photonic crystal material, an electrophoretic material, and an electrowetting material.

Here, the electrophoretic material may refer to a material exhibiting an electrophoretic phenomenon, the electrowetting material may refer to a material exhibiting an electrowetting phenomenon, and a photo-electrochromic material may refer to a material exhibiting a photo-electrochromic phenomenon. Briefly explaining some electric field dependent materials, a photonic crystal is a structure in which a photonic band gap is formed by a regular arrangement of microscopic structures that are spatially repetitive to reflect only a specific wavelength of external incident light. A color expressed by the photonic crystal is called a structure color.

A formation of the photonic band gap depends on a size, a spacing, and a refractive index difference of particles constituting the photonic crystal. Therefore, a color being expressed can be controlled by changing characteristics of the photonic crystal by adjusting an intensity or direction of an electric field.

Electrophoresis is a phenomenon in which charged particles move by an electric field formed between two electrodes. When charged particles with a color are dispersed in a fluid having high resistance and low viscosity and a voltage is applied to two electrodes, the charged particles may display color as they are moving.

As an electrowetting display adopts a principle that conductive fluid (e.g., water) and non-conductive fluid (e.g., oil) do not mix with each other, when a voltage is applied from outside to control a surface tension of the conductive fluid, a wavelength of a reflected light changes as a contact angle of the conductive fluid and a shape of an interface change.

For the refrigerator 1, any of the electric field dependent materials can be used. However, for convenience of explanation, a use of a cholesteric liquid crystal material among liquid crystal materials capable of implementing excellent light transmittance will be described as an example in the following description.

Figure 2B:
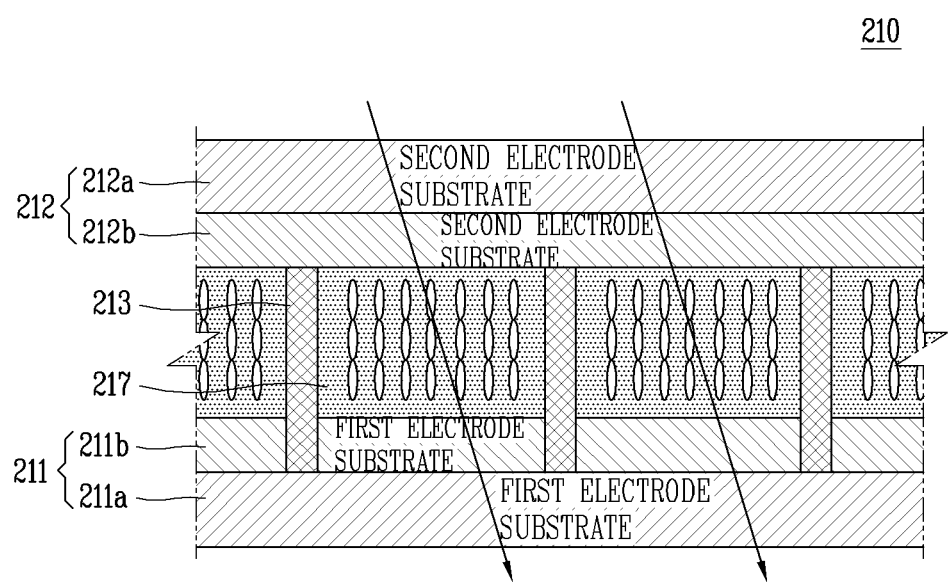

FIG. 2B illustrates an example of an arrangement of a liquid crystal in a homeotropic state. The liquid crystal in the homeotropic state refers to a state in which a helical structure is untwisted so that liquid crystal molecules are arranged in an electric field direction. The arrangement of the liquid crystal molecules in the homeotropic state is an arrangement when a high electric field is formed between the first electrode 211b and the second electrode 212b, and has a characteristic of transmitting light. Accordingly, as illustrated in FIG. 2B, incident light is transmitted as it is, and the door 210 may be viewed transparently. Therefore, in this case, a user can identify food items stored in the refrigerator 1 through the door 210.

Figure 2C:
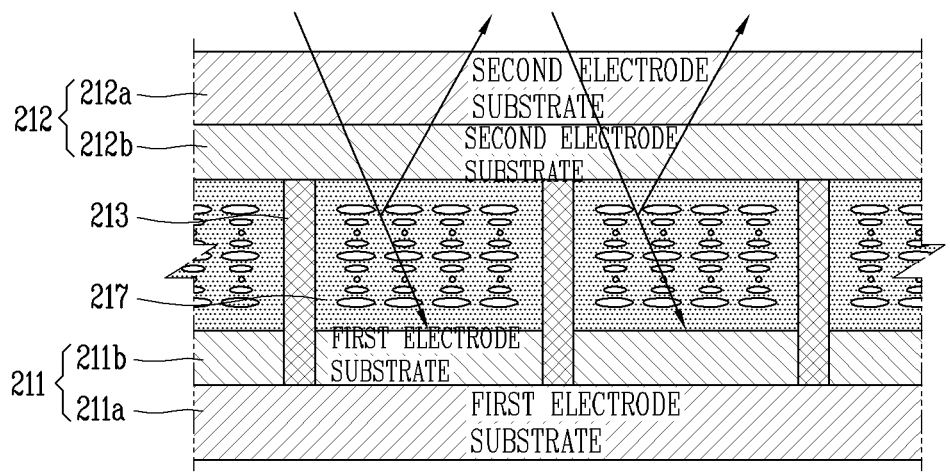

FIG. 2C illustrates an example of an arrangement of a liquid crystal in a planar state. The planar state refers to a state in which a helical axis of the cholesteric liquid crystal is arranged substantially perpendicular to a substrate, for example, a first electrode substrate 211a. A liquid crystal layer 217 in the planar state is an arrangement formed when a high electric field applied to the liquid crystal in the homeotropic state is drastically lowered, whereby reflecting light of a specific wavelength among incident light when the cholesteric liquid crystal is in the planar state.

Here, the specific wavelength is determined according to a helical pitch in the helical structure of the cholesteric liquid crystal. That is, since the wavelength of reflected light can be determined by adjusting the helical pitch, reflected color can be adjusted by adjusting the helical pitch of the cholesteric liquid crystal. Therefore, it is possible to display a desired color without having a separate color filter.

Figure 2D:
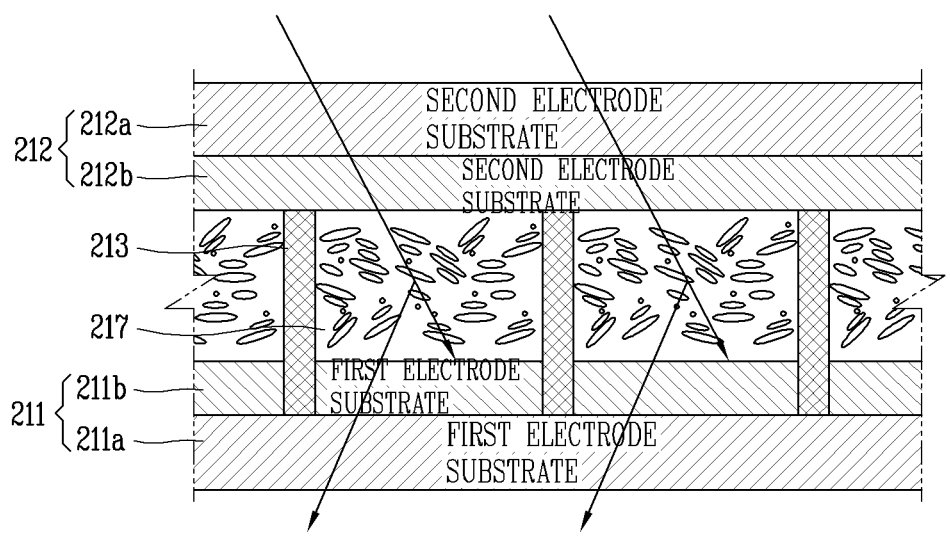

FIG. 2D illustrates an example of an arrangement of a liquid crystal in a focal conic state. The focal conic state may refer to a state in which the helical axis of the cholesteric liquid crystal is arranged substantially parallel to the first electrode substrate 211a. A liquid crystal structure in the focal conic state is an arrangement formed when a high electric field applied to the homeotropic liquid crystal is slowly lowered, and has a characteristic of scattering light. Therefore, when the liquid crystal is in the focal conic state, the door 210 may be in an opaque state.

For example, when an electric field is applied to the cholesteric liquid crystal in the planar state, the cholesteric liquid crystal may be changed to a focal conic state, as the helical axis used to be perpendicular to the first electrode substrate 211a is changed to be parallel to the first electrode substrate 211a. Here, the electric field applied to the cholesteric liquid crystal may be 10-20 V.

When a larger electric field is applied to the cholesteric liquid crystal in the focal conic state, the cholesteric liquid crystal may be changed to the homeotropic state in which liquid crystal molecules are arranged in the electric field direction as the helical structure is untwisted. Here, the electric field applied to the cholesteric liquid crystal may be 30-50 V. And, when the electric field is gradually removed in the homeotropic state, the cholesteric liquid crystal may return to the focal conic state, and when the electric field is rapidly removed, the cholesteric liquid crystal may be changed to the planner state.

In some examples, in order to switch the cholesteric liquid crystal in the focal conic state to the planar state, a step of applying a larger electric field to the cholesteric liquid crystal to switch the cholesteric liquid crystal to the homeotropic state and a step of abruptly removing the electric field may be performed sequentially.

Accordingly, when a user applies a predetermined input, the controller 100 may apply a high voltage to the first electrode 211b and the second electrode 212b to allow the cholesteric liquid crystal to be in the homeotropic state. Then, the door 210 may be viewed transparent as light is transmitted.

In this state, the controller 100 may gradually remove or abruptly remove the high electric field formed in the cell according to a predetermined condition, for example, an elapsed time, thereby making the cholesteric liquid crystal to be in the focal conic state or to be in the planner state. Then, the door 210 may be switched from the transparent state to the opaque state.

Hereinafter, implementations related to a control method that can be implemented in the refrigerator configured as the above will be described with reference to the accompanying drawings. It will be apparent to those skilled in the art that the present disclosure may be implemented in other specific forms without departing from the spirit or essential characteristics thereof.

Figure 3:
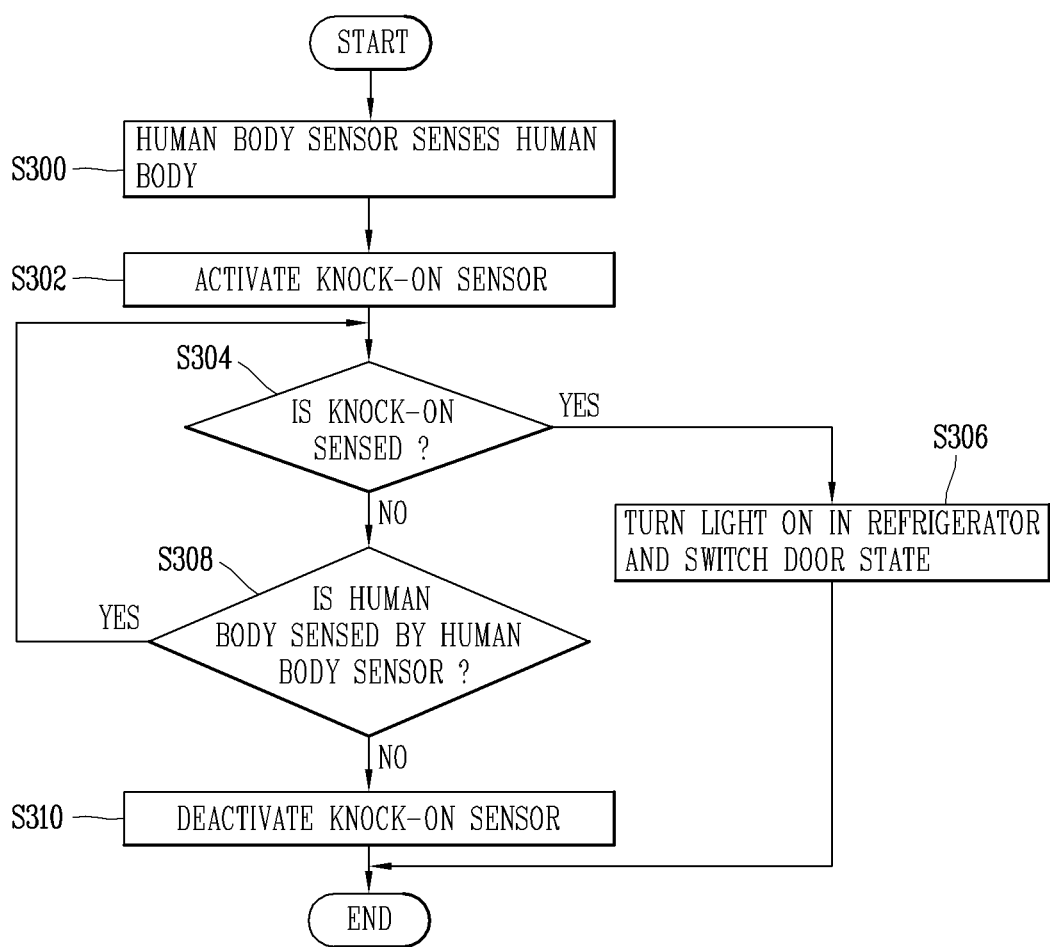
FIG. 3 is a flowchart showing an example of an operation process for controlling a knock-on function by a human body sensor of a refrigerator.

FIG. 3 is a flowchart showing an example of an operation process for controlling the knock-on function by the human body sensor of the refrigerator.

For example, the controller 100 of the refrigerator 1 may control the human body sensor 162 to always maintain an active state. Accordingly, when a user approaches the refrigerator 1, the human body sensor 162 may sense the user [S300].

In addition, when the human body sensor 162 senses a user's approach, the controller 100 may activate the knock-on sensor 164 [S302]. For example, the controller 100 may control the sensing unit 160 such that power is not supplied to the knock-on sensor 164 until the human body sensor 162 senses a user. In addition, when the human body sensor 162 senses a user's approach in step S300, the controller 100 may control the sensing unit 160 such that operation power is supplied to the knock-on sensor 164.

Accordingly, the knock-on sensor 164 may be switched to an active state according to whether the human body sensor 162 senses the user's approach. When the user applies an input for the knock-on function, the door may be switched into a state capable of sensing the input of the user.

In some examples, when the knock-on sensor 164 is activated, the controller 100 may sense whether a user's input is applied through the knock-on sensor 164 [S304].

The knock-on sensor 164 may be a touch sensor having a layer structure or an integrated structure with the door, or a microphone disposed adjacent to the door and capable of sensing sound generated when a user knocks on the door. Accordingly, the touch sensor or the microphone may sense a touch input applied to the door or sense an audio signal generated when a user knocks on the door in a predetermined pattern. Further, the controller 100, based on the sensed touch input or the sensed audio signal, may determine whether the sensed input is an input for the knock-on function, that is, a knock-on input.

In addition, when the input for the knock-on function is sensed in step S304, the controller 100 may execute the knock-on function. That is, the controller 100 may change the state of the door so that the door at which the knock-on input is sensed is switched to be transparent, and may turn on a lighting inside the storage chamber corresponding to the door at which the knock-on input is sensed [S306].

In some examples, in the step S304, when the user's input for selecting the knock-on function is not sensed even though the knock-on sensor is activated, the controller 100 may recheck the sensing result of the human body sensor 162 [S308]. In addition, when the user's body is still sensed by the human body sensor 162, the knock-on sensor 164 may be maintained in the active state by going back to proceed the step S304.

However, as a result of the checking in step S308, when the user's body is no longer sensed, the controller 100 may switch the currently activated knock-on sensor 164 back to the inactive state [S310]. As an example, when the knock-on sensor 164 is activated as operation power is supplied to the knock-on sensor 164, the step S310 may be a step of controlling the sensing unit 160 such that operation power is not supplied to the knock-on sensor 164, or a step of blocking operation power supplied to the knock-on sensor 164 by the controller 100.

Accordingly, the knock-on sensor 164 may be switched to the inactive state again, and the process of FIG. 3 may be performed again according to the sensing result of the human body sensor 162.

As illustrated in FIG. 3, the refrigerator 1 can control whether or not the knock-on sensor 164 is activated based on the result of the human body sensor 162 sensing the user's approach. That is, when the human body sensor 162 does not sense the user's approach, the knock-on sensor 164 remains in the inactive state, and accordingly, even though an impact or knock corresponding to the knock-on input is applied to the door, the knock-on sensor 164 may not sense the impact or knock. Therefore, a possibility of malfunction in which the knock-on function is executed due to a shock or vibration applied to the door even though a user is not located near the refrigerator can be reduced.

In some examples, the human body sensor 162 may sense a user's body approaching the refrigerator 1 as described above. Here, the human body sensor 162 may be disposed at a height higher than or equal to a predetermined height from a floor on which the refrigerator 1 is installed. This is because when the human body sensor 162 is disposed at a height lower than the predetermined height, the human body sensor 162 may incorrectly sense a pet or the like as a user.

In some implementations, the human body sensor 162 may be disposed at a height of 1 m or above from the floor. In general, this may be a height that can be set when a user of a minimum age who can open and close the door of the refrigerator 1 is assumed to be a person aged 7 to 8 years or older.

Figure 4A:
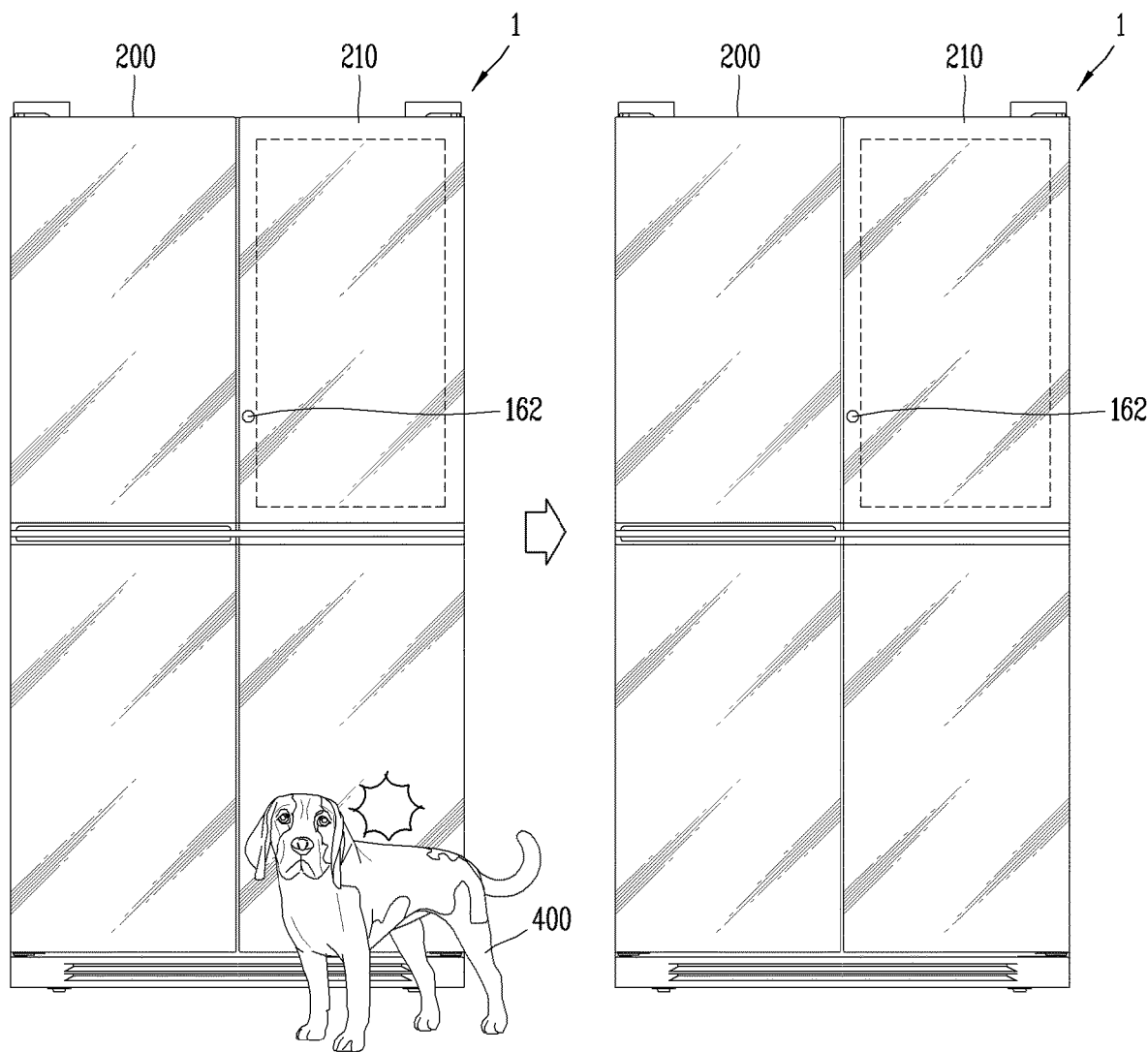
FIGS. 4A and 4B are exemplary views illustrating an example of a human body sensor of a refrigerator.
Figure 4B:
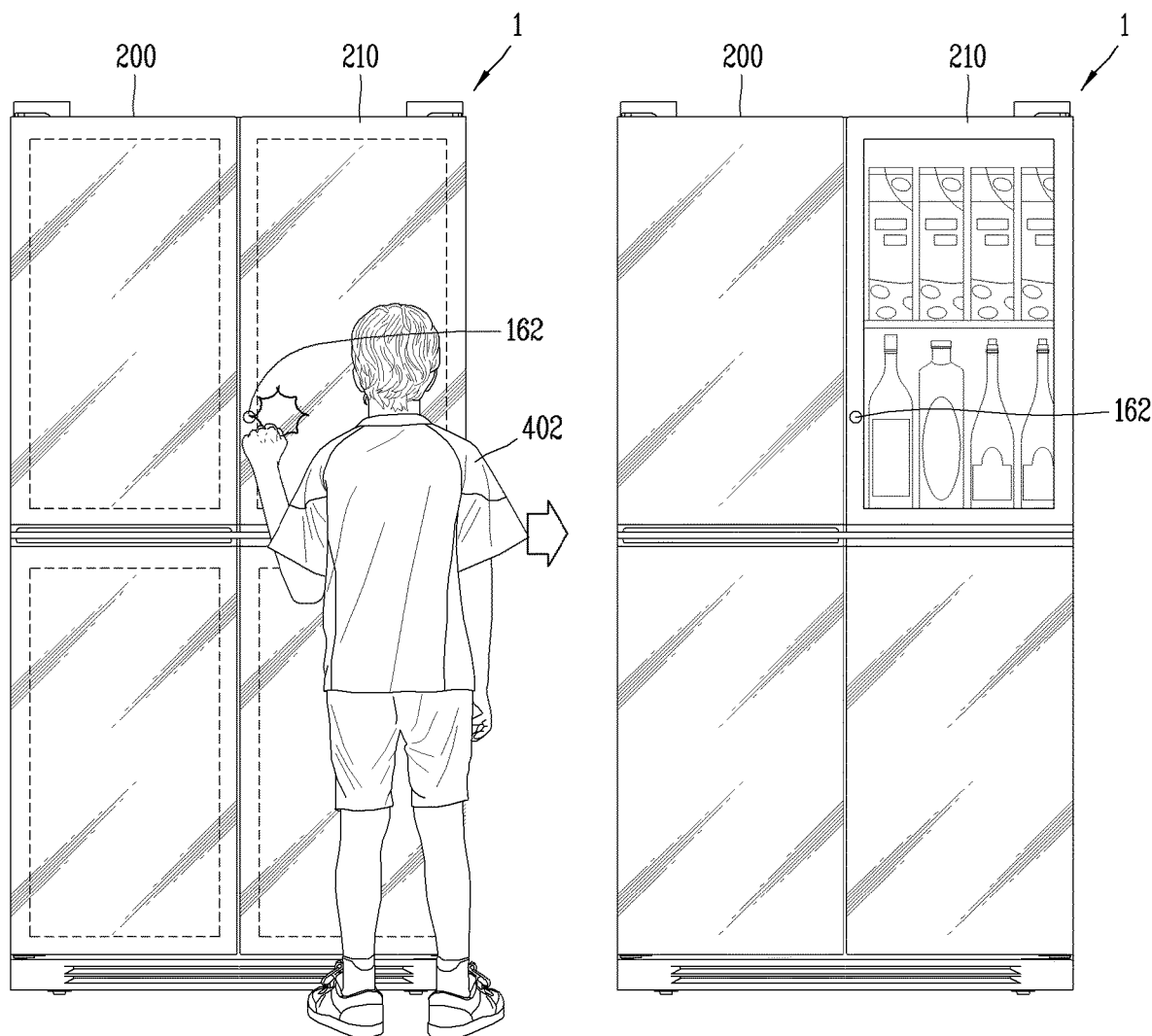

FIGS. 4A and 4B are exemplary views illustrating an example of an operation of the human body sensor disposed at the predetermined height or above.

Referring to FIG. 4A, an example of a pet 400 approached the refrigerator 1 is illustrated. As illustrated in FIG. 4A, when the human body sensor 162 is disposed at a height sufficiently high from the floor on which the refrigerator 1 is installed, the human body sensor 162 may not sense a pet 400 approaching the refrigerator due to the height at which the human body sensor 162 is disposed.

Accordingly, as illustrated on a left view of FIG. 4A, even when the pet 400 approaches or knocks on the refrigerator 1, the knock-on sensor 164 may be maintained in the inactive state. Therefore, even when the approaching or the knocking of the pet 400 is applied to the door, the knock-on sensor 164 may not sense the application, and the knock-on function may not be executed as illustrated on a right view of FIG. 4A.

In some examples, as illustrated on a left view of FIG. 4B, when a person 402 of the predetermined height or above approaches the refrigerator 1, the human body sensor 162 may sense a body of the person 402 approaching the refrigerator 1. Accordingly, the controller 100 may switch the knock-on sensor 164 maintained in the inactive state into the active state. That is, the knock-on sensor 164 may be switched into a state capable of sensing a user's input applied through the door.

Therefore, as illustrated on the left view of FIG. 4B, when the user or person 402 applies an input of knocking on the door 210, the knock-on sensor 164 may sense the input. Then, the controller 100 may control the door portion 120 so that the knock-on function is executed according to the sensed input. Accordingly, as illustrated on the right view of FIG. 4B, at least a part of the door 210 to which the user's input is applied may be switched to be transparent, and a lighting in a storage chamber corresponding to the door 210 may be turned on. Accordingly, the user can check food items stored in the storage chamber corresponding to the door 210 without opening the door 210. In some examples, only the knock-on function has been mentioned in the above description, but other functions similar to the knock-on function may also be controlled in a manner similar to that of FIG. 3. For example, an auto door function, that functions such that when sensing of a user located within a predetermined distance, it is determined that the user intends to open the door of the refrigerator, thereby automatically opening the door of the refrigerator, may also be controlled in a manner similar to that of FIG. 3.

Figure 5:
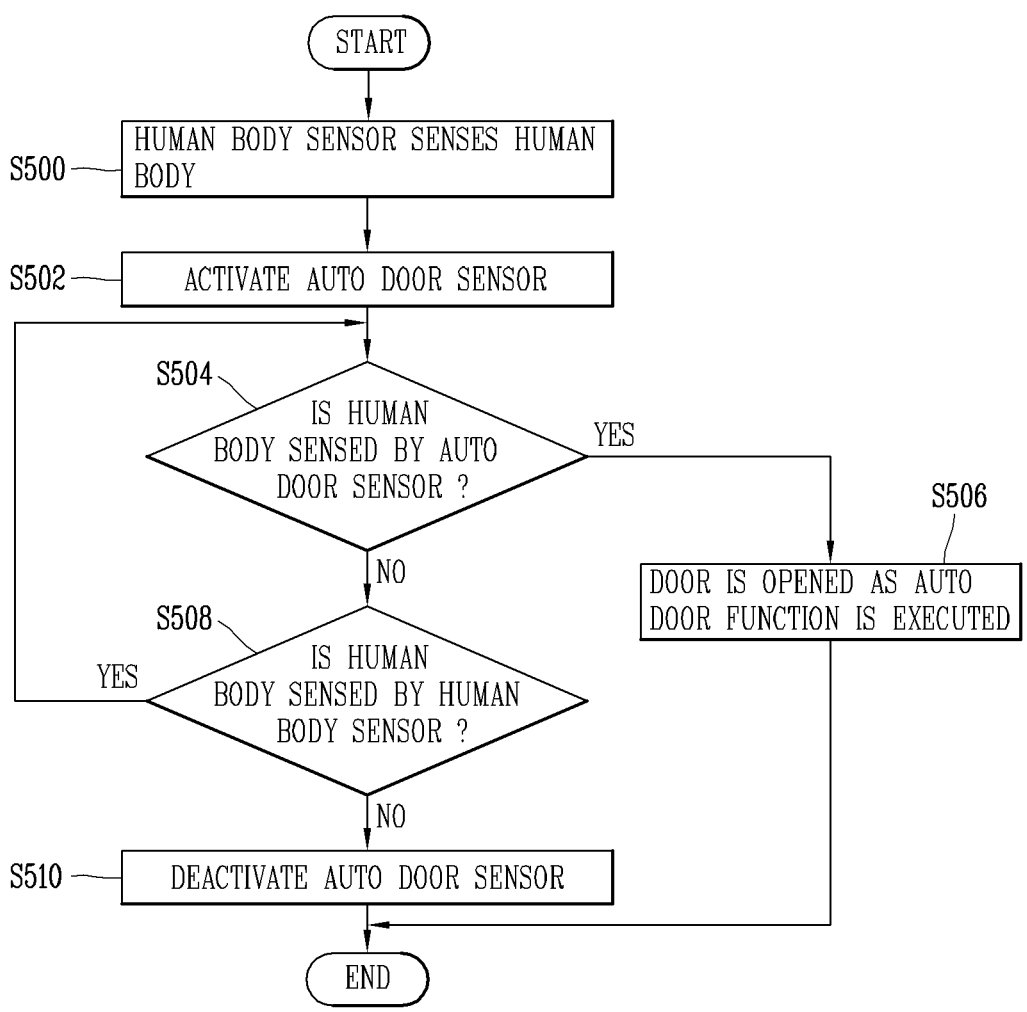
FIG. 5 is a flowchart showing an example of an operation process for controlling an auto door function by a human body sensor of a refrigerator.

FIG. 5 is a flowchart showing an example of an operation process for controlling the auto door function by the human body sensor of the refrigerator.

As described above, the controller 100 of the refrigerator 1 may control the human body sensor 162 to always maintain the active state. Accordingly, when a user approaches the refrigerator 1, the human body sensor 162 may sense the user [S500].

In addition, when the human body sensor 162 senses a user's approach, the controller 100 may activate the auto door sensor 166 [S502]. Here, the controller 100 may control the sensing unit 160 so that power is not supplied to the auto door sensor 166 until the human body sensor 162 senses the user. In addition, when the human body sensor 162 senses the user's approach in step S500, the sensing unit 160 may be controlled so that operation power is supplied to the auto door sensor 166.

In some examples, the auto door sensor 166 may be a proximity sensor that senses a user's body in a vicinity of the door. Here, the proximity sensor may be similar to the human body sensor 162 in that it senses a user's body, but a difference is that a sensing distance is shorter than that of the human body sensor 162.

In addition, when the auto door sensor 166 is activated, the controller 100 may indicate a location of a specific floor adjacent to the door of the refrigerator 1 that can be sensed by the proximity sensor, by turning on a predetermined indicator, that is, a designated LED or by using a laser point or the like. In addition, the controller 100 may check whether the proximity sensor, that is, the auto door sensor 166, senses the user's body [S504].

Accordingly, when the user moves to the location of the specific floor or a location according to the indication of the LED, the proximity sensor may sense the user's body to execute the auto door function [S506]. That is, the door of the refrigerator 1 may be opened according to the execution of the auto door function.

In some examples, in the step S504, when the user's body is not sensed by the auto door sensor 166 even though the auto door sensor 166 is activated, the controller 100 may recheck the sensing result of the human body sensor 162 [S508]. Further, when the user's body is still sensed in the rechecking of the sensing result of the human body sensor 162, whether the user's body is sensed may be checked by the auto door sensor 166 by maintaining the activated state of the auto door sensor 166 and going back to proceed the step S504.

However, as a result of the checking in step S508, when the user's body is no longer sensed by the human body sensor 162, the controller 100 may switch the currently activated auto door sensor back to the inactive state [S510]. For example, when the auto door sensor 166 is activated as operation power is supplied to the auto door sensor 166, the step S510 may be a step of controlling the sensing unit 160 such that operation power is not supplied to the auto door sensor 166, or blocking operation power supplied to the auto door sensor 166 by the controller 100.

Accordingly, the auto door sensor 166 may be switched back to the inactive state. In addition, when a user is sensed again in a vicinity of the refrigerator 1 through the human body sensor 162, the process of FIG. 5 may be proceeded again.

In some examples, although a configuration in which the knock-on function and the auto door function are respectively performed by the sensing result of the human body sensor has been described in the above, the knock-on function and the auto door function may also be linked to each other based on the sensing result of the human body sensor 162.

Figure 6:
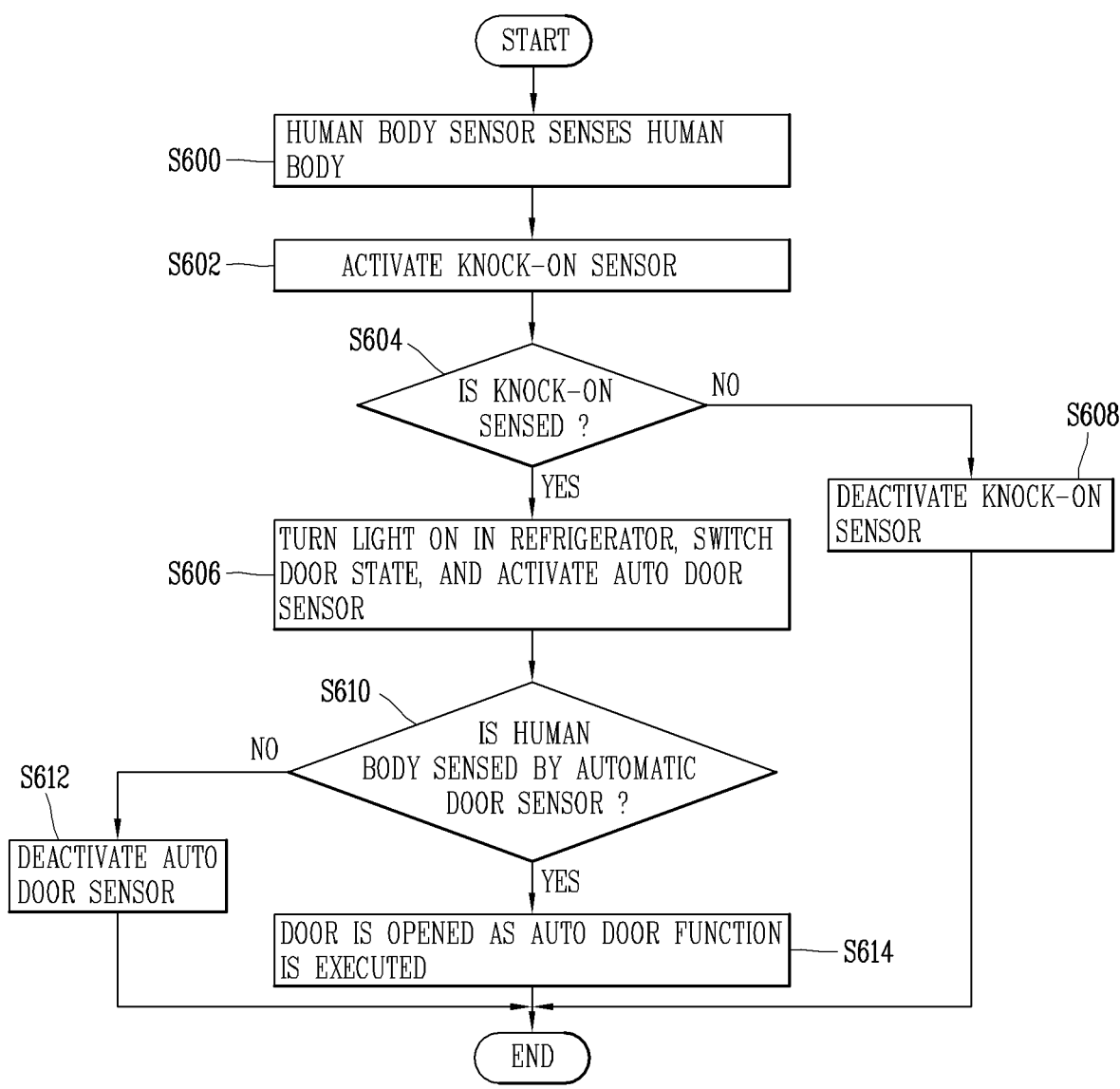
FIG. 6 is a flowchart showing an example of an operation process for controlling a knock-on function and an auto door function linked to the knock-on function by a human body sensor of a refrigerator.

FIG. 6 is a flowchart showing an operation process in which the knock-on function and the auto door function linked to the knock-on function are controlled by the human body sensor in the refrigerator.

The human body sensor 162 of the refrigerator 1 may always be in the active state. In some cases, the knock-on sensor for executing the knock-on function, for example, the touch sensor formed integrally with each door or in the layered structure, or the microphone installed at the door may be in the inactive state. In addition, the auto door sensor for the auto door function, for example, the proximity sensor may be in the inactive state. Here, that the sensor is in the inactive state may refer to a state in which the sensor does not sense even when a predetermined stimulus is applied. For example, when the sensor is in the inactive state, it may refer to a state in which operation power is not supplied to the sensor.

Conversely, when the sensor is in the active state, it may refer to a state in which the sensor can sense a predetermined stimulus. For example, when operation power is supplied to a sensor that has not been supplied with operation power, the sensor may be switched from the inactive state to the active state.

In some examples, unlike the knock-on sensor 164 or the auto door sensor 166, the human body sensor 162 may always be in the active state. Accordingly, when a user approaches the refrigerator 1, the user's body may be sensed [S600].

As a result of the sensing in step S600, when the human body sensor 162 senses the user's body, the controller 100 may activate the knock-on sensor 164 first [S602]. Accordingly, the knock-on sensor 164 may be in a state capable of sensing a user's input applied for the knock-on function, that is, a touch applied to the door of the refrigerator 1 or a knocking on the door in a predetermined pattern.

When the knock-on sensor 164 is activated in this way, the controller 100 may sense whether the knock-on input is applied [S604].

In some examples, when the knock-on input is not sensed from the activated knock-on sensor 164 as a result of the sensing in step S604, the controller 100 may switch the knock-on sensor 164 back to the inactive state [S608]. Accordingly, when a user approaches the refrigerator 1 for other purposes, the knock-on function may not be executed.

Here, the step S608 may further include a process of rechecking the sensing result of the human body sensor 162. In addition, the controller 100 may determine whether the knock-on sensor 164 is deactivated according to the sensing result of the human body sensor 162. That is, when the user is still located in a vicinity of the refrigerator 1, the controller 100 may keep the knock-on sensor 164 activated. However, when the user is no longer sensed in the vicinity of the refrigerator 1, operation power supplied to the knock-on sensor 164 may be cut off or the sensing unit 160 may be controlled so that the knock-on sensor 164 is switched to the inactive state.

In some examples, when the knock-on input of the user is sensed through the knock-on sensor 164 activated in step S604, the controller 100 may execute the knock-on function according to the sensed input [S606]. That is, the controller 100 may switch the door into a transparent state by adjusting a transparency of the door to which the knock-on input is applied. In addition, the controller 100 may turn on a lighting inside a storage chamber corresponding to the door at which the knock-on input is sensed. Therefore, the user can visually check food items stored in the storage chamber through the door switched to the transparent state without opening the door.

In some examples, the step S606 may include a process of activating the auto door sensor 166. Here, the auto door sensor 166 may be the proximity sensor capable of sensing a user's body when the user approaches the refrigerator.

Like the proximity sensor and the human body sensor 162, the auto door sensor 166 may be a sensor that senses a human body. However, as described above, the human body sensor 162 may be disposed at a height higher than or equal to a predetermined height from the floor, and the proximity sensor may be disposed in a vicinity of the floor. Accordingly, the human body sensor 162 may be disposed higher than a position at which the proximity sensor is disposed.

For example, when the refrigerator 1 has a plurality of doors and the plurality of doors includes at least one upper door and at least one lower door, the human body sensor 162 may be disposed at the at least one upper door and the proximity sensor may be disposed at the at least one lower door.

In addition, the proximity sensor and the human body sensor 162 may both be sensors for sensing a human body, but may be sensors each having different sensing distances for sensing a human body. For example, while the proximity sensor is able to sense a human body within a distance of 50 cm which is small, the human body sensor 162 is able to sense a human body within a distance of approximately 1 m. That is, the human body sensor 162 may be a sensor having a wider sensing distance than the proximity sensor.

In some examples, when the knock-on function (a function of switching door to be transparent and turning light on in refrigerator) and the auto door sensor 166 are activated in the step S606, the controller 100 may sense a user's body approaching the refrigerator 1 through the activated auto door sensor 166 [S610]. In addition, when a user's body in a vicinity of the refrigerator 1 is sensed as a result of the sensing in step S610, the door of the refrigerator 1 may be opened according to an execution of the auto door function.

In some examples, as a result of the sensing in step S610, when the user's body in a vicinity of the refrigerator 1 is not sensed by the activated auto door sensor 166, the controller 100 may switch the auto door sensor 166 back to the inactive state [S612]. Accordingly, when the user applies the knock-on input but does not intend to open the door of the refrigerator 1, the auto door sensor 166 may be switched back to the inactive state.

In some examples, the step S612 also, may further include a process of rechecking the sensing result of the human body sensor 162. In addition, the controller 100 may determine whether the auto door sensor 166 is deactivated according to the sensing result of the human body sensor 162. That is, when the user is still located in a vicinity of the refrigerator 1, the controller 100 may keep the auto door sensor 166 activated. However, when the user is no longer sensed in the vicinity of the refrigerator 1, operation power supplied to the auto door sensor 166 may be cut off or the sensing unit 160 may be controlled so that the auto door sensor 166 is switched to the inactive state.

In some examples, when further checking the sensing result of the human body sensor 162 in step S612, the controller 100 may further include a process of checking a current state of the door of the refrigerator 1 and the lighting in the refrigerator 1.

For example, the door switched to be transparent and the lighting turned on due to the execution of the knock-on function may be restored to their original state when a predetermined time elapses after the user's knock-on input is applied. Here, when the user's body in a vicinity of the refrigerator 1 is not sensed by the auto door sensor 166 in the step S610, the controller 100 may first check whether the door switched to be transparent and the lighting turned on are restored to their original state. As a result of the checking, when the door is maintained in the transparent state and the lighting keeps emitting light (before a predetermined period of time has elapsed or when the user additionally applies the knock-on input), the controller 100 may keep the auto door sensor 166 activated.

In some examples, as a result of the checking, when the door is switched to the opaque state and the lighting is turned off, the controller 100 may further include a process of rechecking the sensing result of the human body sensor 162. In addition, the controller 100 may determine whether the auto door sensor 166 is deactivated according to the sensing result of the human body sensor 162. That is, when the door is switched to the opaque state and the lighting is turned off, that is, when the knock-on function is terminated, the controller 100 may deactivate the auto door sensor 166.

Figure 7:
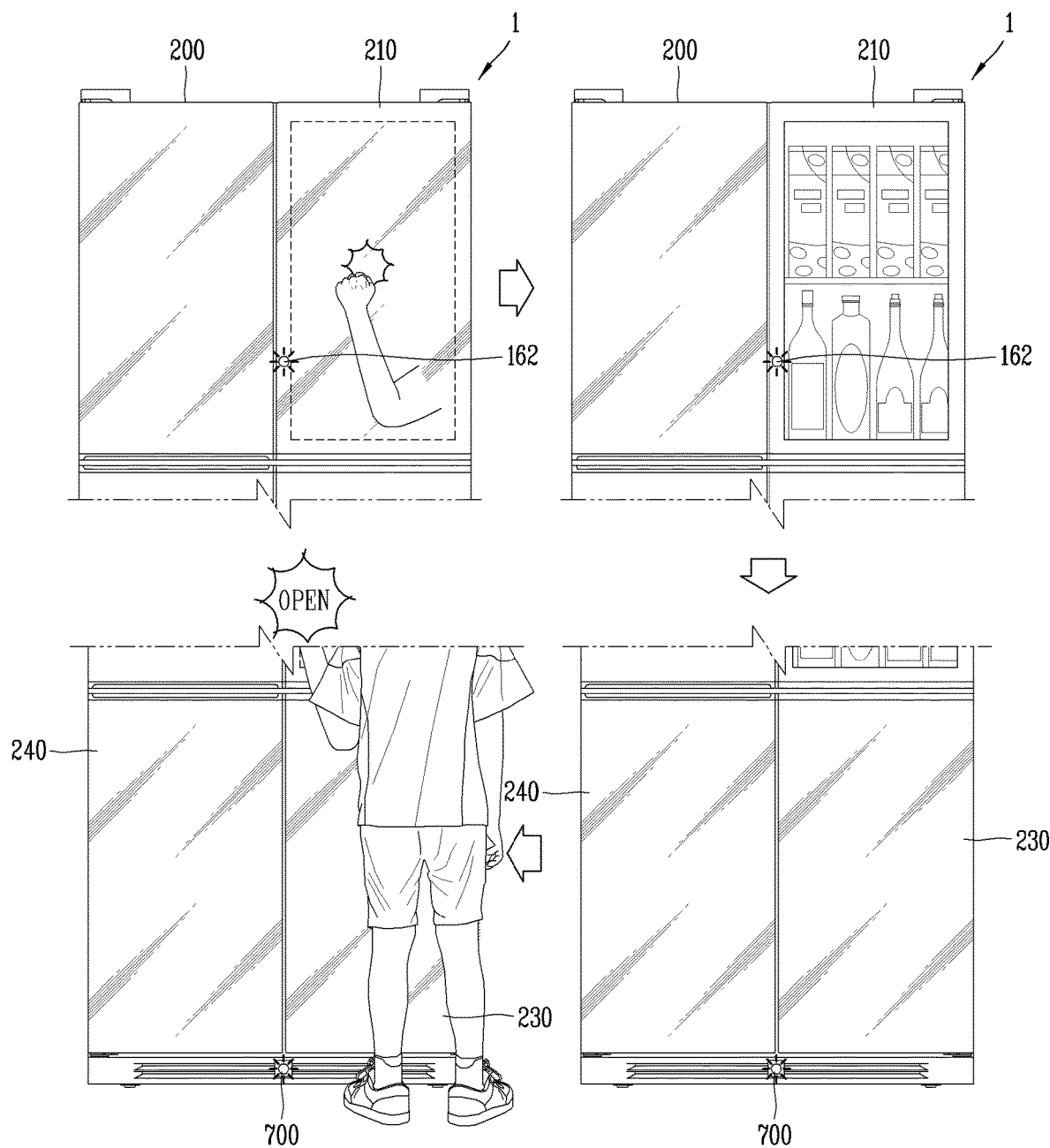
FIG. 7 is an exemplary view illustrating an example of a refrigerator that operates according to the linked operation function shown in FIG. 6.

FIG. 7 is an exemplary view illustrating an example in which the refrigerator operates according to the linked operation function shown in FIG. 6.

Drawings are described in an order in a clockwise direction starting from a drawing at an upper left side. The drawing at the upper left side is named a 'first drawing', a drawing at an upper right side is named a 'second drawing', a drawing at a lower right side is named a 'third drawing', and a drawing at a lower left side is named a 'fourth drawing'.

The upper left drawing of FIG. 7 illustrates an example in which a user in a vicinity of the refrigerator 1 applies the knock-on input by knocking on the door 210. Here, the controller 100 may sense the user's body adjacent to the refrigerator 1 through the human body sensor 162 and sense the knocking through the knock-on sensor 164 activated accordingly.

Therefore, the controller 100 may execute the knock-on function according to the user's input as illustrated in the upper right drawing of FIG. 7. For example, the knock-on function may include a function of switching the door 210, to which the knock-on input is applied, into the transparent state and turning on the lighting in the refrigerator 1 as illustrated in the second drawing. Therefore, as illustrated in the second drawing, even when the door 210 is closed, food items stored in the storage chamber inside the door 210 can be seen through the door 210.

In some examples, as illustrated in the second drawing, when the knock-on function is executed, the controller 100 may activate the auto door sensor 166, that is, a proximity sensor 700 disposed adjacent to the floor on which the refrigerator 1 is installed, at the same time. Here, when the proximity sensor 700 is activated, the controller 100 may indicate a state of the activated proximity sensor 700 with a predetermined indicator. For example, as illustrated in the lower right drawing of FIG. 7, the controller 100 may indicate the active state by turning on a light emitting diode (LED) provided in the proximity sensor 700, or may indicate a range or area that can be sensed by the proximity sensor 700 with a laser or a projector so that a user can identify the range or area.

In this way, when the proximity sensor 700 senses the user's body in a vicinity of the refrigerator 1 in a state in which the proximity sensor 700 is activated and the active state is displayed, the controller 100 may determine that the user has been approached the refrigerator 1 to execute the auto door function. Accordingly, the controller 100 may execute the auto door function, and the door 210 of the refrigerator 1 may be opened according to the execution of the auto door function as illustrated in the lower left drawing of FIG. 7.

Hereinafter, implementations related to a control method that can be implemented in the refrigerator configured as above will be described with reference to the accompanying drawings. It will be apparent to those skilled in the art that the present disclosure may be implemented in other specific forms without departing from the spirit or essential characteristics thereof.

In some examples, in the above description, the human body sensor has been described as being disposed on the refrigerator 1, but the human body sensor 162 may also be provided in a structure attachable to the refrigerator 1. In this way, the human body sensor 162 may be supplied with operation power from a battery built therein, and accordingly, may always maintain the active state.

When the human body sensor 162 is provided as a separate device attachable to the refrigerator 1, the human body sensor 162 may be attached to an arbitrary position on the refrigerator 1 by using magnetic force or a sticker. In addition, when attached to the refrigerator 1, short-range communication with the controller 100 of the refrigerator 1 may be performed.

In some examples, the controller 100 may identify the human body sensor 162 attached to the refrigerator 1 through short-range communication. Then, the controller 100 may control the sensing unit 160 to switch the knock-on sensor 164 or the auto door sensor 166 to the inactive state, or cut off power supplied to the knock-on sensor 164 or the auto door sensor 166.

Then, the human body sensor 162 attached to the refrigerator 1 may transmit the sensing result to the controller 100 through the short-range communication. Then, the controller 100 may activate the knock-on sensor 164 or the auto door sensor 166 based on the sensing result received from the human body sensor 162, and accordingly, a possibility of malfunction in the knock-on function or the auto door function can be reduced.

In some examples, when the human body sensor 162 is provided in a structure attachable to the refrigerator 1 as described above, a height at which the human body sensor 162 is attached may be determined according to a user's selection. That is, the height at which the human body sensor 162 is attached may vary depending on the user's selection. In some examples, the human body sensor 162 can be attached at or above a predetermined height, for example, 1 m or above.

The present disclosure can be implemented as computer-readable codes in program-recorded media. The computer-readable media may include all types of recording devices each storing data readable by a computer system. Examples of such computer-readable medium may include hard disk drive (HDD), solid state disk (SSD), silicon disk drive (SDD), ROM, RAM, CD-ROM, magnetic tape, floppy disk, optical data storage element and the like. Also, the computer-readable media may also be implemented as a format of carrier wave (e.g., transmission via the Internet). The computer may also include the controller 100 of the refrigerator 1. Therefore, it should also be understood that the above-described implementations are not limited by any of the details of the foregoing description, unless otherwise specified, but rather should be construed broadly within its scope as defined in the appended claims. Therefore, all changes and modifications that fall within the metes and bounds of the claims, or equivalents of such metes and bounds are therefore intended to be embraced by the appended claims.

The invention claimed is:

1. A refrigerator, comprising:
a main body having a first storage chamber and a second storage chamber;
a first door configured to open and close the first storage chamber, the first door having a first display area defined at a front surface thereof;
a second door configured to open and close the second storage chamber, the second door having a second display area defined at a front surface thereof;
a first sensor configured to detect an approach of a user to the refrigerator;
at least one second sensor configured to sense a user input by the user to each of the first door and the second door; and
a controller configured to independently control the first display area and the second display area, the controller being configured to change a color of at least one of the first display area or the second display area based on the user input sensed by the at least one second sensor,
wherein each of the first display area and the second display area comprises:
a first tempered glass layer that covers the front surface of a corresponding door among the first and second doors,
a second tempered glass layer spaced apart from the first tempered glass layer, and
an electric field dependent layer disposed between the first tempered glass layer and the second tempered glass layer, the electric field dependent layer being configured to define the color of the corresponding door based on control of the controller, and wherein the controller further configured to:
switch an activation state of any one second sensor that senses a first user input for selecting a first function among a plurality of functions related to the first door or the second door, based on a detection result of the first sensor,
execute the first function and further switch an activation state of another second sensor different from the one second sensor to an activated state based on first user input being sensed through the one second sensor switched to the activated state, and
sense a second user input for selecting a second function among the plurality of functions related to the first door or the second door through the another second sensor switched to the activated state.

2. The refrigerator of claim 1, wherein the first sensor is configured to be maintained as turned on, and the at least one second sensor is configured to be turned on or off according to a sensing result of the first sensor.

3. The refrigerator of claim 1, wherein the first sensor is disposed at a height higher than or equal to a predetermined height from a floor, and
wherein the at least one second sensor comprises a plurality of sensors that are disposed at the first door and the second door, respectively, and configured to sense the user input applied to each of the first door and the second door.

4. The refrigerator of claim 1, wherein a transparency of the first display area or the second display area is adjusted based on the user input sensed through the at least one second sensor, and
wherein the controller is configured to turn on a lighting provided in the first storage chamber or the second storage chamber based on the adjusted transparency of the first display area or the second display area.

5. The refrigerator of claim 1, wherein the at least one second sensor comprises (i) a knock-on sensor configured to receive a knock-on input or (ii) a touch sensor configured to receive a touch input.

6. The refrigerator of claim 1, wherein the at least one second sensor comprises a proximity sensor disposed at a vicinity of a floor, and wherein the first sensor is disposed higher than a position of the proximity sensor with respect to the floor.

7. The refrigerator of claim 1, wherein the first and second display areas are configured to display image information including at least one of text, an image, or a video based on control of the controller.

8. The refrigerator of claim 1, further comprising a memory configured to store programs or applications configured to run on the refrigerator,
wherein a part of the programs or applications stored in the memory is configured to be downloaded through wireless communication from an external server.

9. The refrigerator of claim 1, wherein the electric field dependent layer comprises a conductive fluid, and
wherein the controller is configured to control a surface tension of the conductive fluid based on applying a voltage according to the user input to thereby vary a wavelength of light reflected by the conductive fluid.

10. The refrigerator of claim 1, wherein the first sensor is a separate device that is attachable to the refrigerator and includes a built-in battery, and
wherein the controller is configured to identify that the first sensor is attached to the main body through a short-range communication and to receive a sensing result of the first sensor through the short-range communication.

11. The refrigerator of claim 1, wherein the controller further configured to:
terminate the first function based on a certain period of time having elapsed while the first function is being executed; and
based on the first function being terminated, recheck a sensing result of the first sensor and determine whether to deactivate the another second sensor based on the rechecked sensing result of the first sensor.

12. The refrigerator of claim 1, wherein the controller is provided in a computer system and configured to control the main body, the first door, the second door, and the first sensor, and the at least one second sensor.

13. The refrigerator of claim 1, wherein the electric field dependent layer comprises a polymer dispersed liquid crystal (PDLC) layer configured to switch a transparency of the at least one of the first display area or the second display area.

14. The refrigerator of claim 1, wherein the electric field dependent layer comprises a cholesteric liquid crystal layer configured to adjust a helical pitch thereof to thereby define the color of the at least one of the first display area or the second display area.

* * * * *